United States Patent
Sun et al.

(10) Patent No.: US 11,283,260 B2
(45) Date of Patent: Mar. 22, 2022

(54) CONTROL METHOD AND CONTROL SYSTEM FOR A DISTRIBUTED POWER SOURCE ENERGY GENERATION SYSTEM

(71) Applicant: Tsinghua University, Beijing (CN)

(72) Inventors: Kai Sun, Beijing (CN); Yangjun Lu, Beijing (CN); Hongfei Wu, Beijing (CN)

(73) Assignee: Tsinghua University, Beijing (CN)

( * ) Notice: Subject to any disclaimer, the term of this patent is extended or adjusted under 35 U.S.C. 154(b) by 441 days.

(21) Appl. No.: 16/475,636

(22) PCT Filed: Nov. 29, 2017

(86) PCT No.: PCT/CN2017/113582
§ 371 (c)(1),
(2) Date: Jul. 2, 2019

(87) PCT Pub. No.: WO2018/126822
PCT Pub. Date: Jul. 12, 2018

(65) Prior Publication Data
US 2021/0359512 A1    Nov. 18, 2021

(30) Foreign Application Priority Data
Jan. 9, 2017  (CN) .......................... 201710014053.2

(51) Int. Cl.
*H02J 1/12*    (2006.01)
*H02M 3/335*    (2006.01)

(52) U.S. Cl.
CPC .......... *H02J 1/12* (2013.01); *H02M 3/33573* (2021.05); *H02M 3/33576* (2013.01); *H02J 2300/26* (2020.01)

(58) Field of Classification Search
None
See application file for complete search history.

(56) References Cited

U.S. PATENT DOCUMENTS

2013/0088081 A1*  4/2013  Siri .......................... G06F 1/263
                                                              307/46
2014/0042815 A1*  2/2014  Maksimovic ......... H01L 31/044
                                                              307/63
(Continued)

FOREIGN PATENT DOCUMENTS

CN        101702523 A      5/2010
CN        103869872 A      6/2014
(Continued)

OTHER PUBLICATIONS

International Search Report and Written Opinion for International Application No. PCT/CN2017/113582 dated Feb. 26, 2018.
(Continued)

*Primary Examiner* — Jared Fureman
*Assistant Examiner* — Joel Barnett
(74) *Attorney, Agent, or Firm* — Wolf, Greenfield & Sacks, P.C.

(57) ABSTRACT

A method and a system for controlling a distributed power generation system are disclosed. The distributed power generation system includes N sub isolated three-port converters and N independent distributed DC power sources in a one-to-one correspondence to the N sub isolated three-port converters, N is a natural number greater than 1; an input-port of each of the sub isolated three-port converters is connected to the corresponding distributed DC power source, bidirectional-ports of the sub isolated three-port converters are connected in parallel to build a low voltage DC bus, and output-ports of the sub isolated three-port converters are connected in series and connected to a medium voltage DC distribution network. The control method comprises: controlling an input power of each of the sub isolated three-port converters independently, performing a power-voltage droop control strategy based on a virtual resistor on the bidirectional-port and the output-port to (Continued)

realize the stable control of the bidirectional-port voltage and the voltage sharing control of the output-port voltage of each of the sub isolated three-port converters. A modular design is realized. Thus a viable technical solution is provided for connecting the distributed power generation system to the medium voltage DC distribution network.

16 Claims, 4 Drawing Sheets

(56) References Cited

U.S. PATENT DOCUMENTS

2017/0063233 A1* 3/2017 Lehn ................. H02M 1/15
2017/0155342 A1* 6/2017 Deboy ............ H02M 7/4807

FOREIGN PATENT DOCUMENTS

| CN | 103904638 A | 7/2014 |
|----|-------------|--------|
| CN | 103956894 A | 7/2014 |
| CN | 105553273 A | 5/2016 |
| CN | 106208715 A | 12/2016 |
| CN | 106711994 A | 5/2017 |
| WO | WO 2014/047560 A1 | 3/2014 |

OTHER PUBLICATIONS

Bratcu et al., Cascaded DC-DC Converter Photovoltaic Systems: Power Optimization Issues. IEEE Transactions on Industrial Electronics. Feb. 2011;58(2):403-411.

* cited by examiner

Distributed power generation system

CONTROL METHOD AND CONTROL SYSTEM FOR A DISTRIBUTED POWER SOURCE ENERGY GENERATION SYSTEM

RELATED APPLICATIONS

This application is a national stage filing under 35 U.S.C. § 371 of international application number PCT/CN2017/113582, filed Nov. 29, 2017, which claims the benefit of Chinese application number CN 201710014053.2, filed Jan. 9, 2017. The entire contents of these applications are incorporated herein by reference in their entirety.

FIELD OF THE ART

The present disclosure relates to the field of direct current (DC) power supply system, more particularly, to a method and a system for controlling a distributed power generation system.

BACKGROUND

In recent years, distributed renewable energy sources such as photovoltaic (PV) energy, wind power and the like have become an effective way of alleviating energy crisis and solving the problem of environmental pollution. However, as the output of distributed power energy source such as PV source is a low DC voltage, multi-stage power conversion and heavy line-frequency transformers are required to connect the distributed power source to an AC power grid. In comparison with the AC power grid, a medium voltage DC distribution network can accommodate the distributed DC power sources and DC loads better. By connecting the DC power output by the distributed power generation system to the medium voltage DC distribution network, it can not only reduce the power conversion stages and improve the penetration rate and operating efficiency of the renewable energy power generation system, but also improve the reliability and equipment utilization rate of the distribution network remarkably and reduce the complexity of the grid-connected system. In this case, the distributed power generation system connected to the medium voltage DC distribution network is getting more and more attention.

In the medium voltage DC distribution network corresponding to the conventional medium voltage AC distribution network, the bus voltage will reach 15 kV approximately. It can use the series-connected multiple DC-DC converters to reduce the device voltage stress. As an example, the series-connected multiple DC-DC converters are employed in the paper "A. I. Bratcu, I. Munteanu, S. Bacha, D. Picault, and B. Raison, "Cascaded DC-DC Converter Photovoltaic Systems: Power Optimization Issues," IEEE Transactions on Industrial Electronics, vol. 58, no. 2, pp. 403-411, February, 2011." In the solution disclosed in this paper, because the input-port of each DC-DC converters is connected to an independent distributed power source, distributed input control can be realized theoretically. However, as the output-ports of the DC-DC converters are connected in series and the output voltage of each module is proportional to its input power, the independent control of the distributed power sources will cause the unbalanced output voltage problem. In this case, in order to avoid too high voltage stress on the devices being induced, the independent control of the distributed power sources cannot be applied, thereby the system cannot output the maximum power. The solution disclosed in Chinese patent application No. CN105553273A also employs the series-connected multiple DC-DC converters. Though independent control of the distributed power sources connected to the input-ports of the converters and voltage sharing control of the output-ports of the converters are realized simultaneously, in the solution disclosed in the above application, only one converter transmits power to the DC bus at every single moment, and anti-paralleled diodes at all other converters' output-ports are turned on to bypass them and therefore no power is transmitted to the DC bus from these converters. In this case, the device voltage stress of each DC-DC converter is equal to the voltage of the DC bus, thus losing the advantage of reducing the device voltage stress by connecting the output-ports in series. As a result, it is not suitable for the application that the distributed power sources are connected to the medium voltage DC distribution network.

Due to the above fact, there is the need of providing a control method for a distributed power generation system to be connected to the medium voltage DC distribution network so as to at least partially solve the above problems in the prior art.

SUMMARY

In order to at least partially solve the problems in conventional technology, an aspect of the disclosure provides a method for controlling a distributed power generation system. The distributed power generation system comprises N sub isolated three-port converters and N independent distributed DC power sources in a one-to-one correspondence to the N sub isolated three-port converters, N is a natural number greater than 1; each of the sub isolated three-port converters comprises an input-port, a bidirectional-port and an output-port, wherein the output-port and the input-port of each of the sub isolated three-port converters are electrically isolated from each other, and the output-port and the bidirectional-port of each of the sub isolated three-port converters are electrically isolated from each other; the input-port of each of the sub isolated three-port converters is connected to a corresponding independent distributed DC power source, the bidirectional-ports of the N sub isolated three-port converters are connected in parallel to build a low voltage DC bus, and the output-ports of the N sub isolated three-port converters are connected in series and connected to a medium voltage DC distribution network.

The method comprises:

step S1: for each of the N sub isolated three-port converters, controlling an input power of the sub isolated three-port converter independently according to an input-port voltage and an input-port current sampled at the input port thereof;

step S2: for each of the N sub isolated three-port converters, calculating the input power of the sub isolated three-port converter according to the input-port voltage and the input-port current thereof;

step S3: obtaining an average output power of the N sub isolated three-port converters;

step S4: calculating a new output-port voltage reference of each of the N sub isolated three-port converters according to the following equation:

$$V_{o\_nrefi} = V_{o\_refi} k_{1\_i} P_{avg},$$

wherein i=1,2, ... N, $V_{o\_nrefi}$ is a new output-port voltage reference of an i-th sub isolated three-port converter, $V_{o\_refi}$ is a predetermined output-port voltage reference of the i-th sub isolated three-port converter, $k_{1\_i}$ is a first predetermined coefficient corresponding to the i-th sub isolated three-port converter, and $P_{avg}$ is the average output power;

step S5: for each of the N sub isolated three-port converters, calculating a difference between the input power of the sub isolated three-port converter and the average output power so as to obtain a bidirectional-port power thereof;

step S6: calculating a new bidirectional-port voltage reference of each of the N sub isolated three-port converters according to the following equation:

$$V_{b\_nrefi} = V_{b\_refi} - k_{2\_i} \cdot P_{b\_i},$$

wherein i=1,2, . . . N, $V_{b\_nrefi}$ is a new bidirectional-port voltage reference of the i-th sub isolated three-port converter, $V_{b\_refi}$ is a predetermined bidirectional-port voltage reference of the i-th sub isolated three-port converter, $k_{2\_i}$ is a second predetermined coefficient corresponding to the i-th sub isolated three-port converter, and $P_{b\_i}$ is a bidirectional-port power of the i-th sub isolated three-port converter;

step S7: for each of the N sub isolated three-port converters, comparing an output-port voltage sampled at the output terminal of the sub isolated three-port converter with the new output-port voltage reference thereof so as to obtain an output-port voltage error signal;

step S8: for each of the N sub isolated three-port converters, comparing a bidirectional-port voltage sampled at the bidirectional terminal of the sub isolated three-port converter with the new bidirectional-port voltage reference thereof so as to obtain a bidirectional-port voltage error signal; and step S9: for each of the N sub isolated three-port converters, adjusting the bidirectional-port voltage and the output-port voltage of the sub isolated three-port converter according to the output-port voltage error signal and the bidirectional-port voltage error signal thereof.

Exemplarily, the step S9 comprises:

for each of the N sub isolated three-port converters, taking the output-port voltage error signal of the sub isolated three-port converter as an input of an output voltage regulator corresponding to the sub isolated three-port converter, and taking the bidirectional-port voltage error signal of the sub isolated three-port converter as an input of a bidirectional-port voltage regulator corresponding to the sub isolated three-port converter;

adding an output signal of the output voltage regulator corresponding to the sub isolated three-port converter and an output signal of the bidirectional-port voltage regulator corresponding to the sub isolated three-port converter so as to obtain a control signal; and adjusting the bidirectional-port voltage and the output-port voltage of the sub isolated three-port converter according to the control signal.

Exemplarily, the step S3 comprises:

averaging input powers of the N sub isolated three-port converters so as to obtain the average output power.

Exemplarily, the step S3 comprises:

for each of the N sub isolated three-port converters, calculating an output power of the sub isolated three-port converter according to the output-port voltage and an output-port current sampled at the output-port thereof; and averaging the output powers of the N sub isolated three-port converters so as to obtain the average output power.

Exemplarily, the step S1 comprises:

for each of the N sub isolated three-port converters, performing a maximum power point tracking according to the input-port voltage and the input-port current of the sub isolated three-port converter so as to control the input power thereof independently.

Exemplarily, predetermined output-port voltage references of the N sub isolated three-port converters are the same, predetermined bidirectional-port voltage references of the N sub isolated three-port converters are the same, the first predetermined coefficients corresponding to the N sub isolated three-port converters are the same, and the second predetermined coefficients corresponding to the N sub isolated three-port converters are the same.

Exemplarily, the step S3 is realized as follows:

outputting voltage signals representing the input powers of the N sub isolated three-port converters respectively to a same average output power bus through resistors, and receiving a voltage signal outputted by the average output power bus and representing the average output power.

Exemplarily, the step S3 is realized as follows:

sending voltage signals representing the input powers of the N sub isolated three-port converters respectively to a secondary controller, and receiving the average output power returned by the secondary controller.

Another aspect of the disclosure provides a system for controlling a distributed power generation system, wherein the distributed power generation system comprises N sub isolated three-port converters and N independent distributed DC power sources in a one-to-one correspondence to the N sub isolated three-port converters, N is a natural number greater than 1; each of the sub isolated three-port converters comprises an input-port, a bidirectional-port and an output-port, wherein the output-port and the input-port of each of the sub isolated three-port converters are electrically isolated from each other, and the output-port and the bidirectional-port of each of the sub isolated three-port converters are electrically isolated from each other; the input-port of each of the sub isolated three-port converters is connected to a corresponding distributed DC power source, bidirectional-ports of the N sub isolated three-port converters are connected in parallel to build a low voltage DC bus, and output-ports of the N sub isolated three-port converters are connected in series and connected to a medium voltage DC distribution network;

the system comprises N sub isolated three-port converter controllers in a one-to-one correspondence to the N sub isolated three-port converters, wherein each of the sub isolated three-port converter controllers comprises:

an input power control device configured for controlling an input power of a corresponding sub isolated three-port converter independently according to an input-port voltage and an input-port current sampled at the input-port of the corresponding sub isolated three-port converter;

an input power calculating device configured for calculating the input power of the corresponding sub isolated three-port converter according to the input-port voltage and the input-port current of the corresponding sub isolated three-port converter;

an average power obtaining device configured for obtaining an average output power of the N sub isolated three-port converters;

a new output-port voltage reference calculating device configured for calculating a new output-port voltage reference of the corresponding sub isolated three-port converter according to the following equation:

$$V_{o\_nrefi} = V_{o\_refi} - k_{1\_i} \cdot P_{avg},$$

wherein i=1,2, . . . N, $V_{o\_nrefi}$ is the new output-port voltage reference of the corresponding sub isolated three-port converter, $V_{o\_refi}$ is a predetermined output-port voltage reference of the corresponding sub isolated three-port converter, $k_{1\_i}$ is a first predetermined coefficient corresponding to the corresponding sub isolated three-port converter, and $P_{avg}$ is the average output power;

a bidirectional-port power calculating device configured for calculating a difference between the input power of the corresponding sub isolated three-port converter and the average output power so as to obtain a bidirectional-port power of the corresponding sub isolated three-port converter;

a new bidirectional-port voltage reference calculating device configured for calculating a new bidirectional-port voltage reference of the corresponding sub isolated three-port converter according to the following equation:

$$V_{b\_nref i} = V_{b\_ref i} - k_{2\_i} \cdot P_{b\_i},$$

wherein i=1,2, ... N, $V_{b\_nref i}$ is the new bidirectional-port voltage reference of the corresponding sub isolated three-port converter, $V_{b\_ref i}$ is a predetermined bidirectional-port voltage reference of the corresponding sub isolated three-port converter, $k_{2\_i}$ is a second predetermined coefficient corresponding to the corresponding sub isolated three-port converter, and $P_{b\_i}$ is a bidirectional-port power of the corresponding sub isolated three-port converter;

an output-port voltage error signal obtaining device configured for comparing an output-port voltage sampled at the output-port of the corresponding sub isolated three-port converter with the new output-port voltage reference of the corresponding sub isolated three-port converter so as to obtain an output-port voltage error signal;

a bidirectional-port voltage error signal obtaining device configured for comparing a bidirectional-port voltage sampled at the bidirectional-port of the corresponding sub isolated three-port converter with the new bidirectional-port voltage reference of the corresponding sub isolated three-port converter so as to obtain a bidirectional-port voltage error signal; and a voltage adjusting device configured for adjusting the bidirectional-port voltage and the output-port voltage of the corresponding sub isolated three-port converter according to the output-port voltage error signal and the bidirectional-port voltage error signal of the corresponding sub isolated three-port converter.

Exemplarily, the voltage adjusting device of each of the sub isolated three-port converter controllers comprises:

an input module configured for taking the output-port voltage error signal of the corresponding sub isolated three-port converter as an input of an output voltage regulator corresponding to the sub isolated three-port converter, and for taking the bidirectional-port voltage error signal of the corresponding sub isolated three-port converter as an input of a bidirectional-port voltage regulator corresponding to the sub isolated three-port converter;

an addition module configured for adding an output signal of the output voltage regulator corresponding to the corresponding sub isolated three-port converter and an output signal of the bidirectional-port voltage regulator corresponding to the corresponding sub isolated three-port converter so as to obtain a control signal; and an adjusting module configured for adjusting the bidirectional-port voltage and the output-port voltage of the corresponding sub isolated three-port converter according to the control signal.

Exemplarily, the average power obtaining device of each of the sub isolated three-port converter controllers comprises:

an input averaging module configured for averaging the input powers of the N sub isolated three-port converters so as to obtain the average output power.

Exemplarily, the average power obtaining device of each of the sub isolated three-port converter controllers comprises:

an output power calculating module configured for calculating an output power of the corresponding sub isolated three-port converter according to the output-port voltage and an output-port current sampled at the output-port of the corresponding sub isolated three-port converter; and an output averaging module configured for averaging the output powers of the N sub isolated three-port converters so as to obtain the average output power.

Exemplarily, the input power control device of each of the sub isolated three-port converter controllers comprises:

a maximum power point tracking module configured for performing a maximum power point tracking according to the input-port voltage and the input-port current of the corresponding sub isolated three-port converter so as to control the input power of the sub isolated three-port converter independently.

Exemplarily, predetermined output-port voltage references of the N sub isolated three-port converters are the same, predetermined bidirectional-port voltage references of the N sub isolated three-port converters are the same, the first predetermined coefficients corresponding to the N sub isolated three-port converters are the same, and the second predetermined coefficients corresponding to the N sub isolated three-port converters are the same.

Exemplarily, the average power obtaining device of each of the sub isolated three-port converter controllers comprises an outputting and receiving module configured for outputting a voltage signal representing the input power of the corresponding sub isolated three-port converter to a same average output power bus through a resistor, and receiving a voltage signal outputted by the average output power bus and representing the average output power.

Exemplarily, the average power obtaining device of each of the sub isolated three-port converter controllers comprises a sending and receiving module configured for sending a voltage signal representing the input power of the corresponding sub isolated three-port converter to a secondary controller, and receiving the average output power returned by the secondary controller.

The method and system for controlling the distributed power generation system in the embodiments of the invention can realize the independent power control of each of the distributed power sources, the stable control of the bidirectional-port voltage of each of the sub isolated three-port converters and the voltage sharing control of the output-port voltage of each of the sub isolated three-port converters, which allows each of the distributed power sources to work at the maximum power output status and can also effectively reduce the device voltage stress of the devices on the output sides.

A series of simplified concepts have been introduced in the Summary of the disclosure, which will be described in the Detailed Description in more detail. The disclosure is not intended to limit the key features and essential technical features of the claimed technical solution and determine the scope of protection of the claimed technical solution.

The features and the advantages of the disclosure will be described in detail in the following with reference to the accompanying drawings.

BRIEF DESCRIPTION OF THE DRAWINGS

The following drawings of the invention are a part of the invention to facilitate the understanding of the invention.

Embodiments of the invention and descriptions thereof are shown in the accompanying drawings to explain the principles of the invention. In the drawings.

Figure 1:
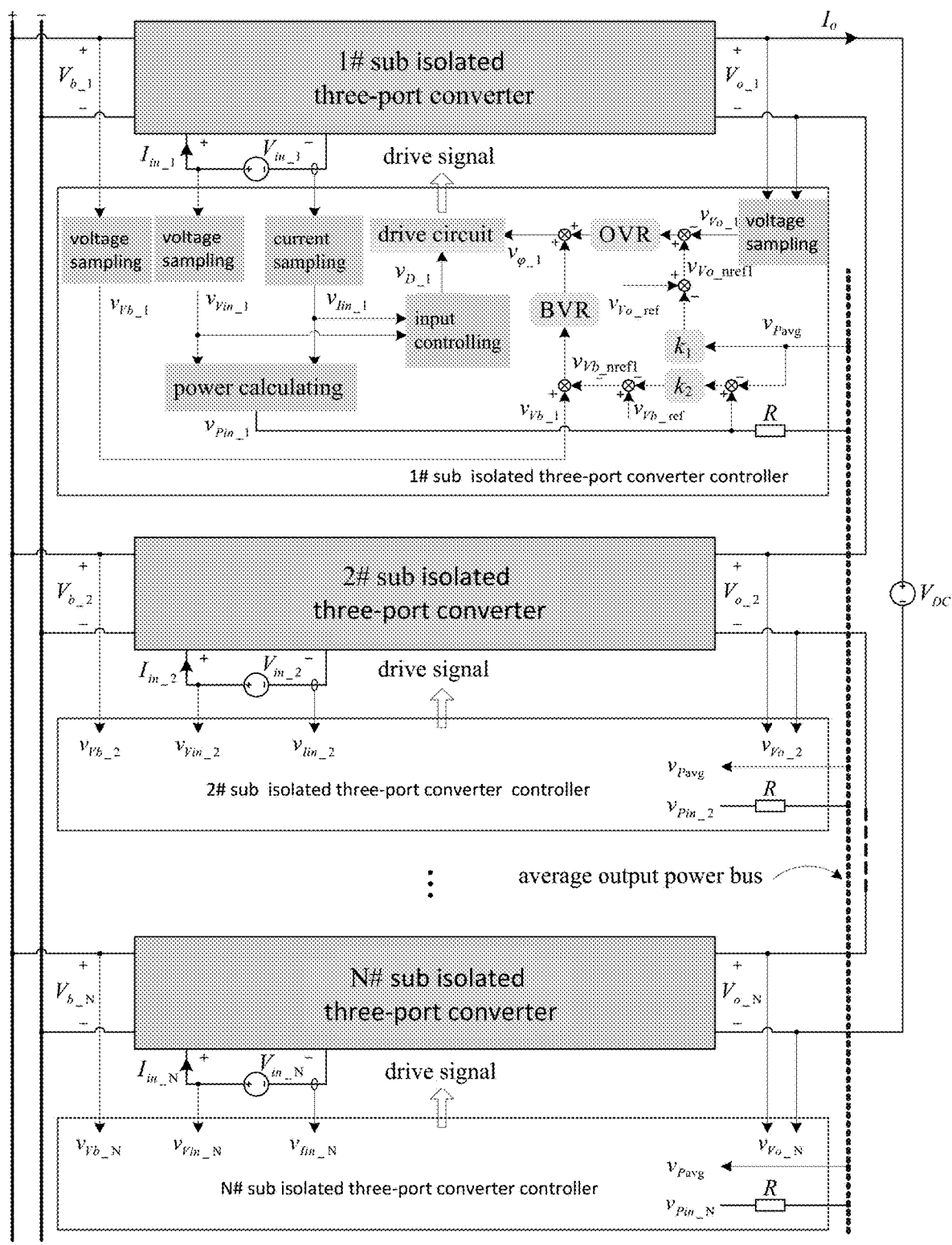
FIG. 1 schematically illustrates a distributed power generation system connected to a medium voltage DC distribution network and a control system thereof in accordance with an embodiment of the invention.

NUMERAL REFERENCE $V_{in\_1} \sim V_{in\_N}$ are input-port voltages of the first to the N-th sub isolated three-port converters;

$I_{in\_1} \sim I_{in\_N}$ are input-port currents of the first to the N-th sub isolated three-port converters;

$V_{b\_1} \sim V_{b\_N}$ are bidirectional-port voltages of the first to the N-th sub isolated three-port converters;

$V_{o\_1} \sim V_{o\_N}$ are output-port voltages of the first to the N-th sub isolated three-port converters;

$I_o$ is an output current of a distributed power generation system connected to a medium voltage DC distribution network, i.e., output-port currents of the first to the N-th sub isolated three-port converters;

$V_{DC}$ is a voltage of the medium voltage DC distribution network;

$v_{Vin\_1} \sim v_{Vin\_N}$ are voltage signals representing input-port voltages of the first to the N-th sub isolated three-port converters;

$v_{Iin\_1} \sim v_{Iin\_N}$ are voltage signals representing input-port currents of the first to the N-th sub isolated three-port converters;

$v_{Pin\_1} \sim v_{Pin\_N}$ are voltage signals representing input powers of the first to the N-th sub isolated three-port converters;

$v_{Pavg}$ is a voltage signal representing an average output power;

$v_{Vb\_1} \sim v_{Vb\_N}$ are voltage signals representing bidirectional-port voltages of the first to the N-th sub isolated three-port converters;

$v_{Vo\_1} \sim v_{Vo\_N}$ are voltage signals representing output-port voltages of the first to the N-th sub isolated three-port converters;

$v_{Io}$ is a voltage signal representing an output current of the distributed power generation system connected to the medium voltage DC distribution network;

$v_{Po\_1} \sim v_{Vo\_N}$ are voltage signals representing output powers of the first to the N-th sub isolated three-port converters;

$v_{Vb\_ref}$ is a voltage signal representing a predetermined bidirectional-port voltage reference of each of the sub isolated three-port converters;

$v_{Vb\_nref1} \sim v_{Vb\_nrefN}$ are voltage signals representing new bidirectional-port voltage references of the first to the N-th sub isolated three-port converters;

$v_{Vo\_ref}$ is a voltage signal representing a predetermined output-port voltage reference of each of the sub isolated three-port converters;

$v_{Vo\_nref1} \sim v_{Vo\_nrefN}$ are voltage signals representing new output-port voltage references of the first to the N-th sub isolated three-port converters;

$k_1$ is a first predetermined coefficient;
$k_2$ is a second predetermined coefficient;
OVR is a output voltage regulator;
BVR is a bidirectional-port voltage regulator;
$v_{D\_1} \sim v_{D\_N}$ are control signals for the input powers of the first to the N-th sub isolated three-port converters;
$v_{\varphi\_1} \sim v_{\varphi\_N}$ are control signals for the bidirectional-port voltages and the output-port voltages of the first to the N-th sub isolated three-port converters;
R is a resistor;
r is a virtual resistor;
$R_L$ is an equivalent line resistor;
$S_1, S_2, S_3, S_4, S_5$ and $S_6$ are active switches;
$D_1$ and $D_2$ are diodes;
$L_1, L_2$ and $L_E$ are inductors;
$C_{in}, C_b, C_{a1}, C_{a2}, C_{o1}$ and $C_{o2}$ are capacitors;
T is a transformer;
$P_{in1}, P_{in2}$ and $P_{in3}$ are input powers of the first, the second and the third sub isolated three-port converters;
$t_1$ and $t_2$ are time.

DETAILED DESCRIPTION

Numerous details are provided in the following description to enable a thorough understanding of the invention. However, it can be understood by those skilled in the art that the following description relates only to the preferred embodiments of the invention and that the invention may be practiced without one or more of such details. In addition, to avoid obscuring the invention, some technical features known in the art are not described.

In order to solve the above problems, the disclosure provides a method for controlling a distributed power generation system connected to a medium voltage DC distribution network. By the control method, it can realize independent control of distributed power sources and voltage sharing control of output-ports of converters.

The disclosure will be described further with reference to FIGS. 1 to 7b. It is noted that, during the transmission of signals, voltage signals may be used to represent certain data. As an example, an average output power $P_{avg}$ may be expressed by a voltage signal $v_{Pavg}$. Therefore, it can be understood that, the voltage signal $v_{Pavg}$ has the same meaning as the average output power $P_{avg}$ in the drawings. Other similar voltage signals are used in the same way, and will not be elaborated herein.

FIG. 1 schematically illustrates a distributed power generation system connected to a medium voltage DC distribution network and a control system thereof in accordance with an embodiment of the invention. The distributed power generation system comprises N sub isolated three-port converters (1# sub isolated three-port converter, 2# sub isolated three-port converter, . . . N# sub isolated three-port converter as illustrated in FIG. 1) and N independent distributed DC power sources ($V_{in\_1}$, $V_{in\_2}$, . . . $V_{in\_N}$ as illustrated in FIG. 1) in a one-to-one correspondence to the N sub isolated three-port converters, where N is a natural number greater than 1. Each of the sub isolated three-port converters comprises an input-port, a bidirectional-port and an output-port, where the output-port and the input-port of each of the sub isolated three-port converters are electrically isolated from each other, and the output-port and the bidirectional-port of each of the sub isolated three-port converters are electrically isolated from each other. The input-port of each of the sub isolated three-port converters is connected to a corresponding distributed DC power source, the bidirectional-ports of the N sub isolated three-port converters are connected in parallel to build a low voltage DC bus, and the output-ports of the N sub isolated three-port converters are connected in series and connected to the medium voltage DC distribution network.

A plurality of sub isolated three-port converters and the corresponding control systems are illustrated in FIG. 1. The method for controlling the distributed power generation system in accordance with the embodiment of the invention is realized by all control systems for the sub isolated three-port converters together. All control systems for the sub isolated three-port converters realize a same control process for the respective corresponding sub isolated three-port converters.

The control method for controlling the distributed power generation system in accordance with the embodiment of the invention comprises the following steps.

Step S1: for each of the N sub isolated three-port converters, an input power $P_{in\_i}$ (i=1, 2, . . . , N) of the sub isolated three-port converter is controlled independently according to an input-port voltage $V_{in\_i}$ (i=1, 2, . . . , N) and an input-port current $I_{in\_i}$ (i=1, 2, . . . , N) sampled at the input-port of the sub isolated three-port converter.

Exemplarily, the step S1 may comprise: for each of the N sub isolated three-port converters, performing a maximum power point tracking according to the input-port voltage $V_{in\_i}$ and the input-port current $I_{in\_i}$ of the sub isolated three-port converter so as to control the input power $P_{in\_i}$ of the sub isolated three-port converter independently.

With reference to 1# sub isolated three-port converter as illustrated in FIG. 1, a voltage sampling and a current sampling are performed at the input-port thereof to determine the input-port voltage $V_{in\_1}$ and the input-port current $I_{in\_1}$. The maximum power point tracking may be performed based on the sampled input-port voltage $V_{in\_1}$ and the sampled input-port current $I_{in\_1}$. The input power $P_{in\_1}$ of 1# sub isolated three-port converter can be controlled independently by way of the maximum power point tracking.

Step S2: for each of the N sub isolated three-port converters, an input power $P_{in\_i}$ of the sub isolated three-port converter is calculated according to the input-port voltage $V_{in\_i}$ and the input-port current $I_{in\_i}$ of the sub isolated three-port converter.

Step S3: an average output power $P_{avg}$ of the N sub isolated three-port converters is obtained.

As an example, the step S3 may comprise: averaging input powers $P_{in\_i}$ of the N sub isolated three-port converters to obtain the average output power $P_{avg}$, i.e., $$P_{avg} = \frac{1}{N}(P_{in\_1} + P_{in\_2} + \ldots + P_{in\_N}), \quad (1)$$

When loss of the system is ignored, the sum of the output powers of all sub isolated three-port converters is equal to the sum of the input powers thereof according to the power conservation theorem. In this case, the average output power can be determined by averaging the input powers of all sub isolated three-port converters.

In another example, the step S3 may comprise: for each of the N sub isolated three-port converters, calculating an output power $P_{o\_i}$ of the sub isolated three-port converter according to an output-port voltage $V_{o\_i}$ and an output-port current $I_o$ sampled at the output-port of the sub isolated three-port converter; and averaging the output powers $P_{o\_i}$ of the N sub isolated three-port converters so as to obtain the average output power $P_{avg}$. The equation for calculating the average output power in the example is as follows:

$$P_{avg} = \frac{1}{N}(P_{o\_1} + P_{o\_2} + \ldots + P_{o\_N}), \quad (2)$$

Figure 2:
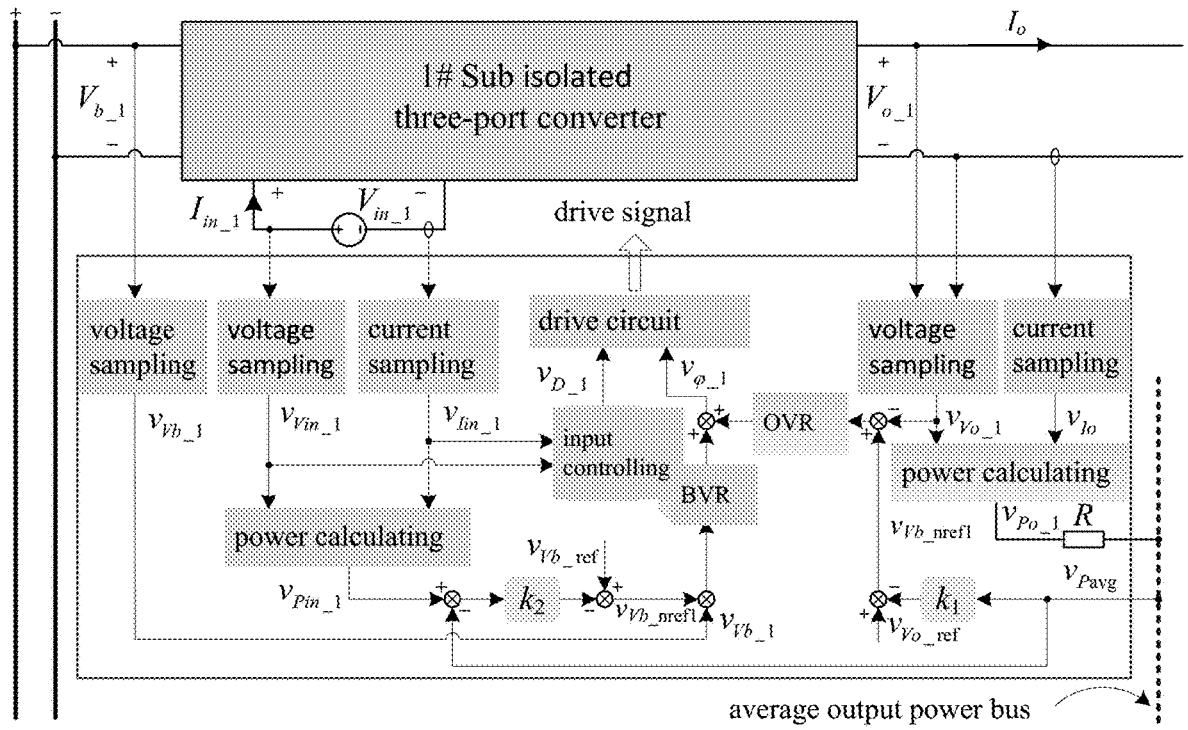
FIG. 2 schematically illustrates a way for obtaining an average output power in accordance with an embodiment of the invention.

The schematic view of the way for obtaining the average output power in the example is illustrated in FIG. 2. FIG. 2 illustrates only a schematic diagram of a controller (and the control method realized thereby) corresponding to 1# sub isolated three-port converter. The principle of other controllers (and the control methods realized thereby) corresponding to the other sub isolated three-port converters is similar to the principle of the controller (and the control method realized thereby) corresponding to 1# sub isolated three-port converter, and will not be elaborated herein.

With reference to FIG. 2, a voltage sampling and a current sampling may be performed at the output-port of 1# sub isolated three-port converter to determine the output-port voltage $V_{o\_1}$ and the output-port current $I_o$. The output power $P_{o\_1}$ of 1# sub isolated three-port converter may be calculated according to the output-port voltage $V_{o\_1}$ and the output-port current $I_o$. It can be understood that, as the output-ports of the N sub isolated three-port converters are connected in series, the output-port currents of all sub isolated three-port converters are the same, and the output-port current can be measured for once for the N sub isolated three-port converters. The average output power calculated according to the output powers of all sub isolated three-port converters directly is more accurate.

Step S4: a new output-port voltage reference of each of the N sub isolated three-port converters is calculated according to the following equation:

$$V_{o\_nrefi} = V_{o\_refi} - k_{1\_i} \cdot P_{avg}, \quad (3)$$

wherein i=1,2, . . . N, $V_{o\_nrefi}$ is a new output-port voltage reference of the i-th sub isolated three-port converter, $V_{o\_refi}$ is a predetermined output-port voltage reference of the i-th sub isolated three-port converter, $k_{1\_i}$ is a first predetermined coefficient corresponding to the i-th sub isolated three-port converter, and $P_{avg}$ is the average output power.

The first predetermined scale factor $k_{1\_i}$ is a constant coefficient greater than zero.

As described above, when the loss of the system is ignored, the sum of the output powers of all sub isolated three-port converters is equal to the sum of the input powers thereof according to the power conservation theorem, i.e., $$P_o = P_{in\_1} + P_{in\_2} + \ldots + P_{in\_N}, \quad (4)$$

$$P_o = I_o \cdot V_{DC}, \quad (5)$$

wherein $P_o$ is the total output power of the N sub isolated three-port converters, and $V_{DC}$ is the voltage of the medium voltage DC distribution network. According to the equations (1) to (5), it may be determined that when the output-port voltage of the i-th sub isolated three-port converter is adjusted based on the new output-port voltage reference, the adjusted output-port voltage is:

$$V_{o\_i} = V_{o\_nrefi} = V_{o\_refi} - \frac{k_{1\_i} \cdot V_{DC}}{N} \cdot I_o, \quad (6)$$

then $$\Sigma_{i=0}^{n} V_{o\_i} = \Sigma_{i=0}^{n} V_{o\_refi} - k_{1\_i} \cdot V_{DC} \cdot I_o = \Sigma_{i=0}^{n} V_{o\_refi} - I_o \cdot r, \quad (7)$$

Figure 3:
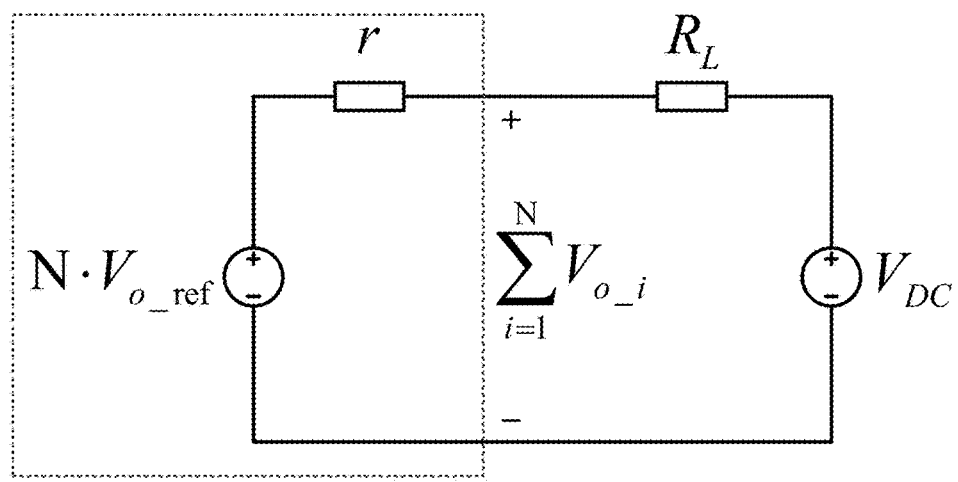
FIG. 3 illustrates an equivalent schematic view of a distributed power generation system controlled by a control method disclosed in accordance with an embodiment of the invention.

According to the equation (7), an equivalent schematic view, as illustrated in FIG. 3, of the distributed power generation system controlled by the control method according to the embodiment of the invention can be obtained, wherein r is an equivalent virtual resistor. As illustrated in FIG. 3, it is assumed that the predetermined output-port voltage references $V_{o\_refi}$ of the N sub isolated three-port converters are the same, which is represented by $V_{o\_ref}$. It is known from the equation (7) and FIG. 3 that, the control method of the output-port voltage of each of the sub isolated three-port converters may be summarized as a power-voltage droop control method based on a virtual resistor.

Step S5: for each of the N sub isolated three-port converters, the difference between the input power of the sub isolated three-port converter and the average output power is calculated, so as to obtain a bidirectional-port power of the sub isolated three-port converter.

The bidirectional-port power of each of the N sub isolated three-port converters is calculated according to the following equation:

$$P_{b\_i} = P_{in\_i} - P_{avg}, \quad (8)$$

wherein $i=1,2,\ldots N$, $b_{b\_i}$ is the bidirectional-port power of the i-th sub isolated three-port converter.

Step S6: a new bidirectional-port voltage reference of each of the N sub isolated three-port converters is calculated according to the following equation:

$$V_{b\_nrefi} = V_{b\_refi} - k_{2\_i} \cdot P_{b\_i}, \quad (9)$$

wherein $i=1,2,\ldots N$, $V_{b\_nrefi}$ is the new bidirectional-port voltage reference of the i-th sub isolated three-port converter, $V_{b\_refi}$ is the predetermined bidirectional-port voltage reference of the i-th sub isolated three-port converter, $k_{2\_i}$ is the second predetermined coefficient corresponding to the i-th sub isolated three-port converter.

The second predetermined scale factor $k_{2\_i}$ is a constant coefficient greater than zero.

When a bidirectional-port voltage of the i-th sub isolated three-port converter is adjusted on the basis of the new bidirectional-port voltage reference, the adjusted bidirectional-port voltage is:

$$V_{b\_i} = V_{b\_nrefi} = V_{b\_refi} - k_{2\_i} \cdot V_b \cdot I_{b\_i} = V_{b\_refi} - I_{b\_i} \cdot r_b, \quad (10)$$

wherein $i=1,2,\ldots N$, $V_{b\_i}$ is the bidirectional-port voltage of the i-th sub isolated three-port converter, $V_b$ is a low voltage DC bus voltage, $I_{b\_i}$ is the bidirectional-port current of the i-th sub isolated three-port converter, and $r_b$ is a virtual resistor.

Similar to the output-port voltage, the control method of the bidirectional-port voltage of each of the sub isolated three-port converters may be summarized as a power-voltage droop control method based on a virtual resistor.

Step S7: for each of the N sub isolated three-port converters, the output-port voltage $V_{o\_i}$ sampled at the output-port of the sub isolated three-port converter is compared with the new output-port voltage reference $V_{o\_nrefi}$ of the sub isolated three-port converter, so as to obtain an output-port voltage error signal.

Step S8: for each of the N sub isolated three-port converters, a bidirectional-port voltage $V_{b\_i}$ sampled at the bidirectional-port of the sub isolated three-port converter is compared with the new bidirectional-port voltage reference $V_{b\_nrefi}$ of the sub isolated three-port converter, so as to obtain a bidirectional-port voltage error signal.

Step S9: for each of the N sub isolated three-port converters, the bidirectional-port voltage and the output-port voltage of the sub isolated three-port converter are adjusted according to the output-port voltage error signal and the bidirectional-port voltage error signal of the sub isolated three-port converter.

Exemplarily, the step S9 may comprise: for each of the N sub isolated three-port converters, taking the output-port voltage error signal of the sub isolated three-port converter as an input of an output voltage regulator (OVR) corresponding to the sub isolated three-port converter, and taking the bidirectional-port voltage error signal of the sub isolated three-port converter as an input of a bidirectional-port voltage regulator (BVR) corresponding to the sub isolated three-port converter; adding an output signal of the OVR corresponding to the sub isolated three-port converter and an output signal of the BVR corresponding to the sub isolated three-port converter so as to obtain a control signal; and adjusting the bidirectional-port voltage and the output-port voltage of the sub isolated three-port converter according to the control signal.

With reference to FIG. 1, it may sample at the output-port of 1# sub isolated three-port converter so as to determine the output-port voltage $V_{o\_1}$ thereof. $V_{o\_1}$ may be compared with $V_{o\_nref1}$ so as to obtain the output-port voltage error signal. And then the output-port voltage error signal may be inputted to the OVR.

Moreover, it may sample at the bidirectional-port of 1# sub isolated three-port converter so as to determine the bidirectional-port voltage $V_{b\_1}$ thereof. $V_{b\_1}$ may be compared with $V_{b\_nref1}$ so as to obtain the bidirectional-port voltage error signal. And then the bidirectional-port voltage error signal may be inputted to the BVR.

It may add the output signals of the OVR and the BVR corresponding to 1# sub isolated three-port converter so as to obtain the control signal $v_{\varphi\_1}$. $v_{\varphi\_1}$ is used to adjust the bidirectional-port voltage and the output-port voltage of the sub isolated three-port converter so as to realize stable voltage control of the bidirectional-port and voltage sharing control of the output-port finally.

As illustrated in FIG. 1, both the control signal $v_{D\_1}$ of the input power and the control signal $v_{\varphi\_1}$ of the bidirectional-port voltage and the output-port voltage are inputted into a drive circuit, the drive circuit generates a corresponding drive signal, and the sub isolated three-port converter can change the value of the voltage and/or the current of each terminal under the control of the drive signal.

Exemplarily, the predetermined output-port voltage references $V_{o\_refi}$ of the N sub isolated three-port converters are the same, the predetermined bidirectional-port voltage references $V_{b\_refi}$ of the N sub isolated three-port converters are the same, the first predetermined coefficients $k_{1\_i}$ corresponding to the N sub isolated three-port converters respectively are the same, and the second predetermined coefficients $k_{2\_i}$ corresponding to the N sub isolated three-port converters respectively are the same. By setting the above parameters of each of the sub isolated three-port converters to be the same, it can accelerate the related calculating process of each of the sub isolated three-port converters, thereby realizing the control of the input power and the output-port voltage of each of the sub isolated three-port converters more conveniently. The distributed power generation systems as illustrated in FIG. 1 and FIG. 2 correspond to the example, that is, the predetermined output-port voltage references $V_{o\_refi}$ of the N sub isolated three-port converters are the same and referred to as $V_{o\_ref}$ collectively, the predetermined bidirectional-port voltage references $V_{b\_refi}$ are the same and referred to as $V_{b\_ref}$ collectively, the first predetermined coefficients $k_{1\_i}$ are the same and referred to as $k_1$ collectively, and the second predetermined coefficients $k_{2\_i}$ are the same and referred to as $k_2$ collectively.

As an example, the step S3 may be realized as follows: outputting voltage signals representing the input powers of the N sub isolated three-port converters respectively to a same average output power bus through resistors, and receiving a voltage signal outputted by the average output power bus and representing the average output power.

That is, it may connect the voltage signals $v_{Pin\_i}$ (i=1, 2, . . . N), which represent the input powers of the sub isolated three-port converters respectively, together through the resistors to build the average output power bus. The resistances of the resistors corresponding to the sub isolated three-port converters are the same.

According to another example, the step S3 may be realized as follows: sending voltage signals representing the input powers of the N sub isolated three-port converters respectively to a secondary controller, and receiving the average output power returned by the secondary controller.

Figure 4:
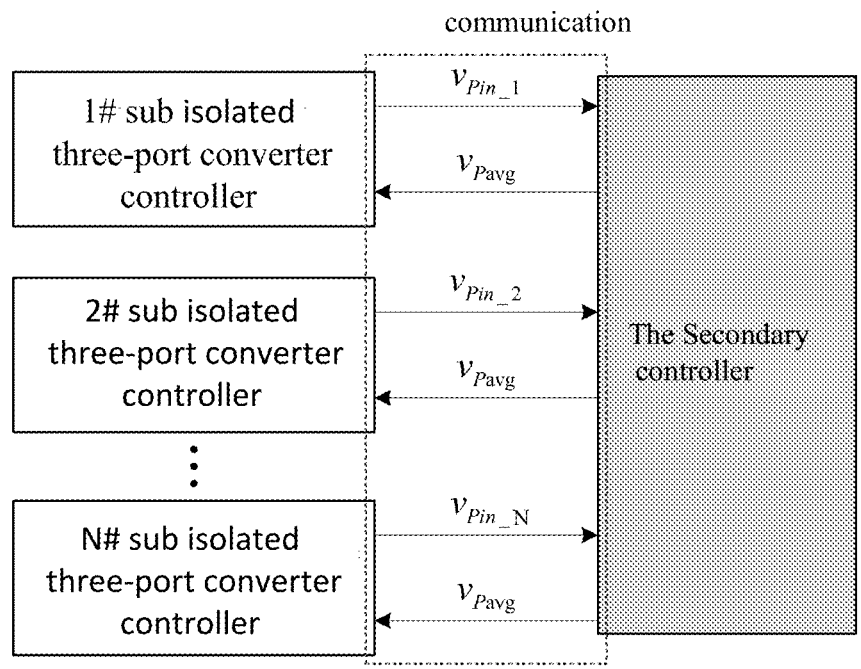
FIG. 4 schematically illustrates a way for obtaining an average output power in accordance with another embodiment of the invention.

Each of the sub isolated three-port converter controllers sends the voltage signal $v_{Pin\_i}$ representing the input power of the corresponding sub isolated three-port converter to the secondary controller through communication, the secondary controller performs calculation to obtain the average output power, then the secondary controller transmits the average output power to each of the sub isolated three-port converter controllers through communication. The schematic diagram of the example is as illustrated in FIG. 4.

The control method according to the embodiment of the invention has the following advantageous effects:

(1) The input-port of each of the sub isolated three-port converters is connected to an independent distributed power source, thereby realizing independent power control of each of the distributed power sources and allowing each of the distributed power sources to operate at the maximum power output status;

(2) The output-ports of the sub isolated three-port converters are connected in series, and thus the device voltage stress of the devices on the output side can be reduced. In the same time, the control method provided by the embodiment of the invention can realize the voltage sharing control of the output-ports of all sub isolated three-port converters, and allow the device voltage stress of the devices on the output sides of each of the sub isolated three-port converters to be no difference.

Figure 5:
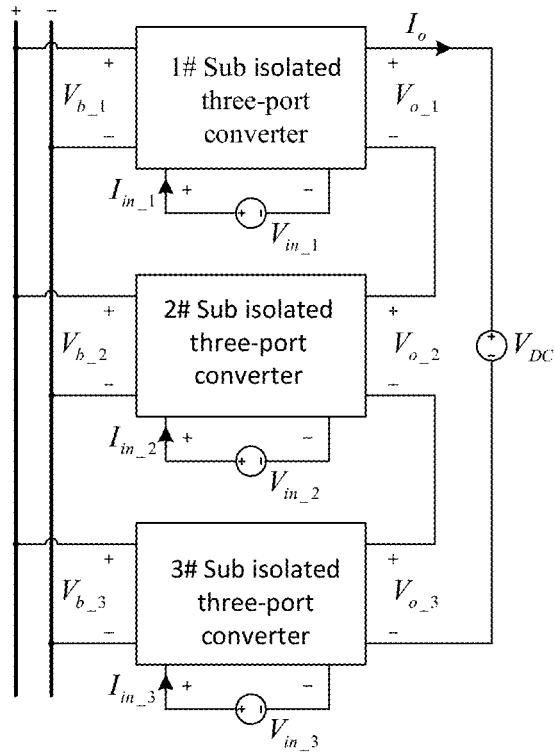
FIG. 5 schematically illustrates a structure of a distributed power generation system connected to a medium voltage DC distribution network in accordance with an embodiment of the invention.
Figure 6:
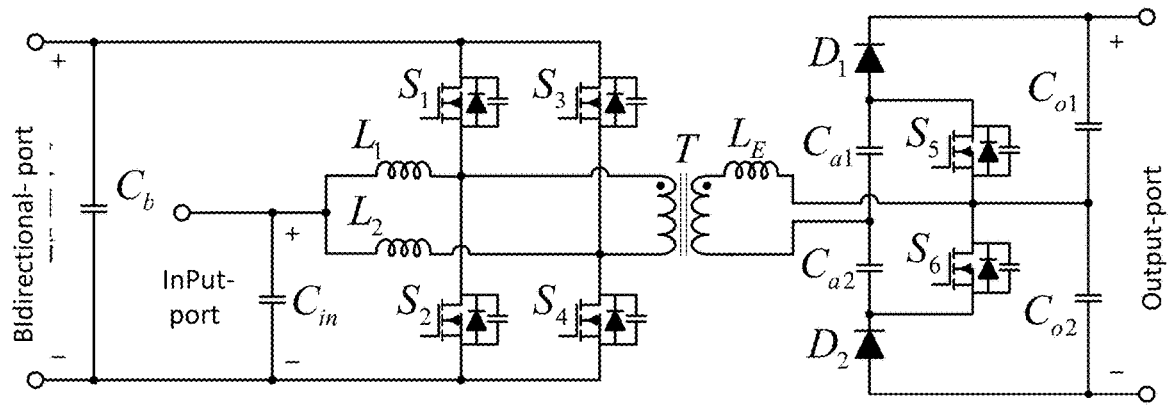
FIG. 6 schematically illustrates a circuit diagram of a sub isolated three-port converter in accordance with an embodiment of the invention.

FIG. 5 schematically illustrates a structure of a distributed power generation system connected to a medium voltage DC distribution network in accordance with an embodiment of the invention. FIG. 6 schematically illustrates a schematic circuit of a sub isolated three-port converter in accordance with an embodiment of the invention.

FIG. 5 schematically illustrates a distributed power generation system formed by three sub isolated three-port converters, wherein each of the sub isolated three-port converters may employ a circuit topology as illustrated in FIG. 6. An input-port of each of the sub isolated three-port converters is connected to a solar photovoltaic cell separately, maximum power point tracking control of the solar photovoltaic cell is realized by adjusting duty ratios of the first to fourth active switches ($S_1$ to $S_4$) in the sub isolated three-port converter illustrated in FIG. 6, and stable voltage control of the bidirectional-port and voltage sharing control of the output-port of each of the sub isolated three-port converters are realized by adjusting phase shift angles of the drive signals of the fifth and sixth active switches ($S_5$, $S_6$) relative to the drive signals of the first to fourth active switches ($S_1$ to $S_4$).

Figure 7A:
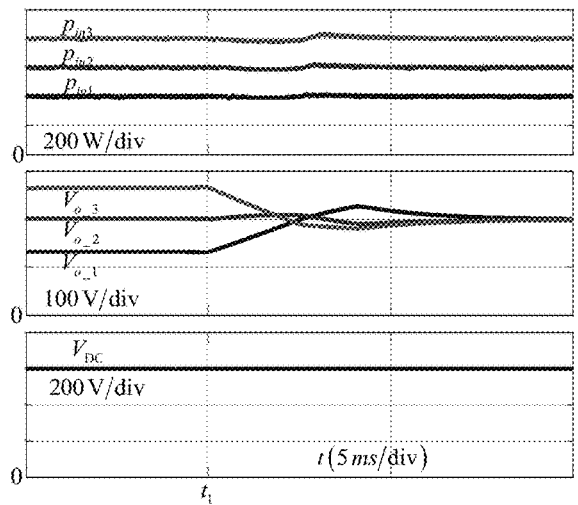
FIG. 7a schematically illustrates a graph of simulation result for controlling a distributed power generation system by a control method in accordance with an embodiment of the invention.
Figure 7B:
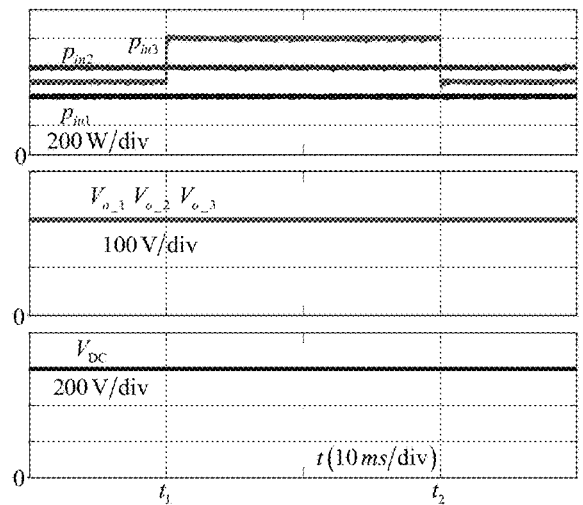
FIG. 7b schematically illustrates a graph of simulation result for controlling a distributed power generation system by a control method in accordance with another embodiment of the invention.

FIG. 7a and FIG. 7b schematically illustrate a graph of simulation results for controlling a distributed power generation system by a control method in accordance with an embodiment of the invention. In FIG. 7a and FIG. 7b, "W/div" is "watts/div", indicating how many watts of power corresponds to per division, "V/div" is "volts/div", indicating how many volts of voltage corresponds to per division, and "ms/div" is "millisecond/div", indicating how many milliseconds per division.

In the example as illustrated in FIG. 7a, the control method described herein is not used before the time $t_1$, and the control method described herein is used to control the distributed power generation system from the time $t_1$. It can be seen from FIG. 7a that, as the output power of each solar photovoltaic cell (i.e., the input power of the corresponding sub isolated three-port converter) is controlled independently and may operate at the maximum power point, the output power of the solar photovoltaic cell connected to each of the sub isolated three-port converters may be different from the others. As illustrated in FIG. 7a, the control method described herein is not used before the time $t_1$. At this period, the output-port voltage of each of the sub isolated three-port converters is proportional to the output power of the connected solar photovoltaic cell and the output-port voltages cannot be balanced. At the time $t_1$, the control strategy described herein is introduced, and the output-port voltages of the sub isolated three-port converters reaches an automatic balance quickly, thereby indicating the effectiveness of the control method described herein. In the example as illustrated in FIG. 7b, the distributed power generation system is controlled by the control method described herein all the time. It can be seen from FIG. 7b that, in the case of the distributed power generation system being controlled by the control method described herein, when the input power of a sub isolated three-port converter changes suddenly, the output-port voltage of the sub isolated three-port converters can still stay balanced well, further indicating the effectiveness of the control method described herein.

The control system of the distributed power generation system and each of the sub isolated three-port converter controllers therein may be realized by any suitable hardware, software and/or firmware. Exemplarily, the control system of the distributed power generation system and each of the sub isolated three-port converter controllers therein may be realized by field programmable gate arrays (FPGAs), digital signal processors (DSPs), complex programmable logic devices (CPLDs), micro-control units (MCUs), or central processing units (CPUs) and the like.

Another aspect of the disclosure provides a system for controlling a distributed power generation system, wherein the distributed power generation system comprises N sub isolated three-port converters and N independent distributed DC power sources in a one-to-one correspondence to the N sub isolated three-port converters. N is a natural number greater than 1. Each of the sub isolated three-port converters comprises an input-port, a bidirectional-port and an output-port. The output-port and the input-port of each of the sub isolated three-port converters are electrically isolated from each other, and the output-port and the bidirectional-port of each of the sub isolated three-port converters are electrically isolated from each other. The input-port of each of the sub isolated three-port converters is connected to a corresponding distributed DC power source. Bidirectional-ports of the N sub isolated three-port converters are connected in parallel to build a low voltage DC bus, and output-ports of the N sub isolated three-port converters are connected in series and connected to a medium voltage DC distribution network. The system comprises N sub isolated three-port converter controllers in a one-to-one correspondence to the N sub isolated three-port converters. Each of the sub isolated three-port converter controllers comprises an input power control device, an input power calculating device, an average power obtaining device, a new output-port voltage reference calculating device, a bidirectional-port power calculating device, a new bidirectional-port voltage reference calculating device, an output-port voltage error signal obtaining device, a bidirectional-port voltage error signal obtaining device and a voltage adjusting device.

The input power control device is configured for controlling an input power of a corresponding sub isolated three-port converter independently according to an input-port voltage and an input-port current sampled at the input-port of the corresponding sub isolated three-port converter.

The input power calculating device is configured for calculating the input power of the corresponding sub isolated three-port converter according to the input-port voltage and the input-port current of the corresponding sub isolated three-port converter.

The average power obtaining device is configured for obtaining an average output power of the N sub isolated three-port converters.

The new output-port voltage reference calculating device is configured for calculating a new output-port voltage reference of the corresponding sub isolated three-port converter according to the following equation:

$$V_{o\_nrefi} = V_{o\_refi} - k_{1\_i} \cdot P_{avg},$$

wherein i=1,2, ... N, $V_{o\_nrefi}$ is the new output-port voltage reference of the corresponding sub isolated three-port converter, $V_{o\_refi}$ is a predetermined output-port voltage reference of the corresponding sub isolated three-port converter, $k_{1\_i}$ is a first predetermined coefficient corresponding to the corresponding sub isolated three-port converter, and $P_{avg}$ is the average output power.

The bidirectional-port power calculating device is configured for calculating the difference between the input power of the corresponding sub isolated three-port converter and the average output power so as to obtain a bidirectional-port power of the corresponding sub isolated three-port converter.

The new bidirectional-port voltage reference calculating device is configured for calculating a new bidirectional-port voltage reference of the corresponding sub isolated three-port converter according to the following equation:

$$V_{b\_nrefi} = V_{b\_refi} - k_{2\_i} \cdot P_{b\_i},$$

wherein i=1,2, ... N, $V_{b\_nrefi}$ is the new bidirectional-port voltage reference of the corresponding sub isolated three-port converter, $V_{b\_refi}$ is a predetermined bidirectional-port voltage reference of the corresponding sub isolated three-port converter, $k_{2\_i}$ is a second predetermined coefficient corresponding to the corresponding sub isolated three-port converter, and $P_{b\_i}$ is a bidirectional-port power of the corresponding sub isolated three-port converter.

The output-port voltage error signal obtaining device is configured for comparing an output-port voltage sampled at the output-port of the corresponding sub isolated three-port converter with the new output-port voltage reference of the corresponding sub isolated three-port converter so as to obtain an output-port voltage error signal.

The bidirectional-port voltage error signal obtaining device is configured for comparing a bidirectional-port voltage sampled at the bidirectional-port of the corresponding sub isolated three-port converter with the new bidirectional-port voltage reference of the corresponding sub isolated three-port converter so as to obtain a bidirectional-port voltage error signal.

The voltage adjusting device is configured for adjusting the bidirectional-port voltage and the output-port voltage of the corresponding sub isolated three-port converter according to the output-port voltage error signal and the bidirectional-port voltage error signal of the corresponding sub isolated three-port converter.

Exemplarily, the voltage adjusting device of each of the sub isolated three-port converter controllers comprises an input module, an addition module and an adjusting module. The input module is configured for taking the output-port voltage error signal of the corresponding sub isolated three-port converter as an input of an output voltage regulator corresponding to the sub isolated three-port converter, and taking the bidirectional-port voltage error signal of the corresponding sub isolated three-port converter as an input of a bidirectional-port voltage regulator corresponding to the sub isolated three-port converter. The addition module is configured for adding an output signal of the output voltage regulator corresponding to the corresponding sub isolated three-port converter and an output signal of the bidirectional-port voltage regulator corresponding to the corresponding sub isolated three-port converter so as to obtain a control signal. The adjusting module is configured for adjusting the bidirectional-port voltage and the output-port voltage of the corresponding sub isolated three-port converter according to the control signal.

Exemplarily, the average power obtaining device of each of the sub isolated three-port converter controllers comprises an input averaging module configured for averaging the input powers of the N sub isolated three-port converters so as to obtain the average output power.

Exemplarily, the average power obtaining device of each of the sub isolated three-port converter controllers comprises: an output power calculating module configured for calculating an output power of the corresponding sub isolated three-port converter according to the output-port voltage and an output-port current sampled at the output-port of the corresponding sub isolated three-port converter; and an output averaging module configured for averaging the output powers of the N sub isolated three-port converters so as to obtain the average output power.

Exemplarily, the input power control device of each of the sub isolated three-port converter controllers comprises a maximum power point tracking module configured for performing a maximum power point tracking according to the input-port voltage and the input-port current of the corresponding sub isolated three-port converter so as to control the input power of the corresponding sub isolated three-port converter independently.

Exemplarily, the predetermined output-port voltage references of the N sub isolated three-port converters are the same, predetermined bidirectional-port voltage references of the N sub isolated three-port converters are the same, the first predetermined coefficients corresponding to the N sub isolated three-port converters are the same, and the second predetermined coefficients corresponding to the N sub isolated three-port converters are the same.

Exemplarily, the average power obtaining device of each of the sub isolated three-port converter controllers comprises an outputting and receiving module configured for outputting a voltage signal representing the input power of the corresponding sub isolated three-port converter to a same average output power bus through a resistor, and receiving a voltage signal outputted by an average output power bus and representing the average output power.

Exemplarily, the average power obtaining device of each of the sub isolated three-port converter controllers comprises a sending and receiving module configured for sending a voltage signal representing the input power of the corresponding sub isolated three-port converter to a secondary controller, and for receiving the average output power returned by the secondary controller.

The principles, implementations and advantages of the control method for the distributed power generation system according to embodiments of the invention have been described above in connection with FIGS. 1 to 7b. Those skilled in the art will understand the related system through the description of the control method for the distributed power generation system, which will not be elaborated herein.

With reference to the control method and the control system, the input power of each of the sub isolated three-port converters can be controlled independently, a power-voltage droop control strategy based on a virtual resistor is performed on the bidirectional-port and the output-port of the sub isolated three-port converters to realize the stable control of the bidirectional-port voltage and the voltage sharing control of the output-port voltage of each of the sub isolated three-port converters. The modular design is realized. Thus a viable technical solution is provided for connecting the distributed power generation system to the medium voltage DC distribution network.

The invention has been described with reference to the above embodiments. However, it is to be understood that the above embodiments are for illustrative purposes only and are not intended to limit the invention to the scope of the described embodiments. Moreover, it can be understood by those skilled in the art that, the invention is not limited to the above embodiments, more variants and modifications may be made in accordance with the invention, and the variants and modifications are all within the scope of the disclosure. The scopes of the disclosure are defined by the accompanying claims.

What is claimed is:

1. A method for controlling a distributed power generation system, wherein the distributed power generation system comprises N sub isolated three-port converters and N independent distributed DC power sources in a one-to-one correspondence to the N sub isolated three-port converters, N is a natural number greater than 1; each of the sub isolated three-port converters comprises an input-port, a bidirectional-port and an output-port, wherein the output-port and the input-port of each of the sub isolated three-port converters are electrically isolated from each other, and the output-port and the bidirectional-port of each of the sub isolated three-port converters are electrically isolated from each other; the input-port of each of the sub isolated three-port converters is connected to a corresponding distributed DC power source, bidirectional-ports of the N sub isolated three-port converters are connected in parallel to build a low voltage DC bus, and output-ports of the N sub isolated three-port converters are connected in series and connected to a medium voltage DC distribution network;

the method comprises:

Step S1: for each of the N sub isolated three-port converters, controlling an input power of the sub isolated three-port converter independently, according to an input-port voltage and an input-port current sampled at the input-port thereof;

Step S2: for each of the N sub isolated three-port converters, calculating the input power of the sub isolated three-port converter, according to the input-port voltage and the input-port current thereof;

Step S3: obtaining an average output power of the N sub isolated three-port converters;

Step S4: calculating a new output-port voltage reference of each of the N sub isolated three-port converters according to the following equation:

$$V_{o\_nrefi} = V_{o\_refi} - k_{1\_i} \cdot P_{avg},$$

wherein i=1,2, ... N, $V_{o\_nrefi}$ is a new output-port voltage reference of an i-th sub isolated three-port converter, $V_{o\_refi}$ is a predetermined output-port voltage reference of the i-th sub isolated three-port converter, $k_{1\_i}$ is a first predetermined coefficient corresponding to the i-th sub isolated three-port converter, and $P_{avg}$ is the average output power;

Step S5: for each of the N sub isolated three-port converters, calculating a difference between the input power of the sub isolated three-port converter and the average output power so as to obtain a bidirectional-port power thereof;

Step S6: calculating a new bidirectional-port voltage reference of each of the N sub isolated three-port converters according to the following equation:

$$V_{b\_nrefi} = V_{b\_refi} - k_{2\_i} \cdot P_{b\_i},$$

wherein i=1,2, ... N, $V_{b\_nrefi}$ is a new bidirectional-port voltage reference of the i-th sub isolated three-port converter, $V_{b\_refi}$ is a predetermined bidirectional-port voltage reference of the i-th sub isolated three-port converter, $k_{2\_i}$ is a second predetermined coefficient corresponding to the i-th sub isolated three-port converter, and $P_{b\_i}$ is a bidirectional-port power of the i-th sub isolated three-port converter;

Step S7: for each of the N sub isolated three-port converters, comparing an output-port voltage sampled at the output-port of the sub isolated three-port converter with the new output-port voltage reference thereof so as to obtain an output-port voltage error signal;

Step S8: for each of the N sub isolated three-port converters, comparing a bidirectional-port voltage sampled at the bidirectional-port of the sub isolated three-port converter with the new bidirectional-port voltage reference thereof so as to obtain a bidirectional-port voltage error signal; and Step S9: for each of the N sub isolated three-port converters, adjusting the bidirectional-port voltage and the output-port voltage of the sub isolated three-port converter, according to the output-port voltage error signal and the bidirectional-port voltage error signal thereof.

2. The method of claim 1, wherein the Step S9 comprises:
for each of the N sub isolated three-port converters,
taking the output-port voltage error signal of the sub isolated three-port converter as an input of an output voltage regulator corresponding to the sub isolated three-port converter, and taking the bidirectional-port voltage error signal of the sub isolated three-port converter as an input of a bidirectional-port voltage regulator corresponding to the sub isolated three-port converter;
adding an output signal of the output voltage regulator corresponding to the sub isolated three-port converter and an output signal of the bidirectional-port voltage regulator corresponding to the sub isolated three-port converter so as to obtain a control signal; and
adjusting the bidirectional-port voltage and the output-port voltage of the sub isolated three-port converter according to the control signal.

3. The method of claim 1, wherein the step S3 comprises:
averaging input powers of the N sub isolated three-port converters so as to obtain the average output power.

4. The method of claim 1, wherein the step S3 comprises:
for each of the N sub isolated three-port converters, calculating an output power of the sub isolated three-port converter, according to the output-port voltage and an output-port current sampled at the output-port thereof; and
averaging the output powers of the N sub isolated three-port converters so as to obtain the average output power.

5. The method of claim 1, wherein the step S1 comprises:
for each of the N sub isolated three-port converters, performing a maximum power point tracking according to the input-port voltage and the input-port current of the sub isolated three-port converter, so as to control the input power thereof independently.

6. The method of claim 1, wherein predetermined output-port voltage references of the N sub isolated three-port converters are the same, predetermined bidirectional-port voltage references of the N sub isolated three-port converters are the same, first predetermined coefficients corresponding to the N sub isolated three-port converters are the same, and second predetermined coefficients corresponding to the N sub isolated three-port converters are the same.

7. The method of claim 1, wherein the step S3 is realized as follows:
outputting voltage signals representing the input powers of the N sub isolated three-port converters respectively to a same average output power bus through resistors, and receiving a voltage signal outputted by the average output power bus and representing the average output power.

8. The method of claim 1, wherein the step S3 is realized as follows:
sending voltage signals representing the input powers of the N sub isolated three-port converters respectively to a secondary controller, and receiving the average output power returned by the secondary controller.

9. A system for controlling a distributed power generation system, wherein the distributed power generation system comprises N sub isolated three-port converters and N independent distributed DC power sources in a one-to-one correspondence to the N sub isolated three-port converters, N is a natural number greater than 1; each of the sub isolated three-port converters comprises an input-port, a bidirectional-port and an output-port, wherein the output-port and the input-port of each of the sub isolated three-port converters are electrically isolated from each other, and the output-port and the bidirectional-port of each of the sub isolated three-port converters are electrically isolated from each other; the input-port of each of the sub isolated three-port converters is connected to a corresponding distributed DC power source, bidirectional-ports of the N sub isolated three-port converters are connected in parallel to build a low voltage DC bus, and output-ports of the N sub isolated three-port converters are connected in series and connected to a medium voltage DC distribution network;
the system comprises N sub isolated three-port converter controllers in a one-to-one correspondence to the N sub isolated three-port converters, wherein each of the sub isolated three-port converter controllers comprises:
an input power control device configured for controlling an input power of a corresponding sub isolated three-port converter independently, according to an input-port voltage and an input-port current sampled at the input-port of the corresponding sub isolated three-port converter;
an input power calculating device configured for calculating the input power of the corresponding sub isolated three-port converter, according to the input-port voltage and the input-port current of the corresponding sub isolated three-port converter;
an average power obtaining device configured for obtaining an average output power of the N sub isolated three-port converters;
a new output-port voltage reference calculating device configured for calculating a new output-port voltage reference of the corresponding sub isolated three-port converter according to the following equation:

$$V_{o\_nrefi} = V_{o\_refi} - k_{1\_i} \cdot P_{avg},$$

wherein i=1,2, ... N, $V_{o\_nrefi}$ is the new output-port voltage reference of the corresponding sub isolated three-port converter, $V_{o\_refi}$ is a predetermined output-port voltage reference of the corresponding sub isolated three-port converter, $k_{1\_i}$ is a first predetermined coefficient corresponding to the corresponding sub isolated three-port converter, and $P_{avg}$ is the average output power;
a bidirectional-port power calculating device configured for calculating a difference between the input power of the corresponding sub isolated three-port converter and the average output power so as to obtain a bidirectional-port power of the corresponding sub isolated three-port converter;
a new bidirectional-port voltage reference calculating device configured for calculating a new bidirectional-port voltage reference of the corresponding sub isolated three-port converter according to the following equation:

$$V_{b\_nrefi} = V_{b\_refi} - k_{2\_i} \cdot P_{b\_i},$$

wherein i=1,2, ... N, $V_{b\_nrefi}$ is the new bidirectional-port voltage reference of the corresponding sub isolated three-port converter, $V_{b\_refi}$ is a predetermined bidirectional-port voltage reference of the corresponding sub isolated three-port converter, $k_{2\_i}$ is a second predetermined coefficient corresponding to the corresponding sub isolated three-port converter, and $P_{b\_i}$ is a bidirectional-port power of the corresponding sub isolated three-port converter;

an output-port voltage error signal obtaining device configured for comparing an output-port voltage sampled at the output-port of the corresponding sub isolated three-port converter with the new output-port voltage reference of the corresponding sub isolated three-port converter, so as to obtain an output-port voltage error signal;

a bidirectional-port voltage error signal obtaining device configured for comparing a bidirectional-port voltage sampled at the bidirectional-port of the corresponding sub isolated three-port converter with the new bidirectional-port voltage reference of the corresponding sub isolated three-port converter, so as to obtain a bidirectional-port voltage error signal; and a voltage adjusting device configured for adjusting the bidirectional-port voltage and the output-port voltage of the corresponding sub isolated three-port converter according to the output-port voltage error signal and the bidirectional-port voltage error signal of the corresponding sub isolated three-port converter.

10. The system of claim 9, wherein the voltage adjusting device of each of the sub isolated three-port converter controllers comprises:

an input module configured for taking the output-port voltage error signal of the corresponding sub isolated three-port converter as an input of an output voltage regulator corresponding to the sub isolated three-port converter, and taking the bidirectional-port voltage error signal of the corresponding sub isolated three-port converter as an input of a bidirectional-port voltage regulator corresponding to the sub isolated three-port converter;

an addition module configured for adding an output signal of the output voltage regulator corresponding to the sub isolated three-port converter and an output signal of the bidirectional-port voltage regulator corresponding to the sub isolated three-port converter so as to obtain a control signal; and an adjusting module configured for adjusting the bidirectional-port voltage and the output-port voltage of the sub isolated three-port converter according to the control signal.

11. The system of claim 9, wherein the average power obtaining device of each of the sub isolated three-port converter controllers comprises:

an input averaging module configured for averaging the input powers of the N sub isolated three-port converters so as to obtain the average output power.

12. The system of claim 9, wherein the average power obtaining device of each of the sub isolated three-port converter controllers comprises:

an output power calculating module configured for calculating an output power of the corresponding sub isolated three-port converter according to the output-port voltage and an output-port current sampled at the output-port of the corresponding sub isolated three-port converter; and an output averaging module configured for averaging the output powers of the N sub isolated three-port converters so as to obtain the average output power.

13. The system of claim 9, wherein the input power control device of each of the sub isolated three-port converter controllers comprises:

a maximum power point tracking module configured for performing a maximum power point tracking according to the input-port voltage and the input-port current of the corresponding sub isolated three-port converter so as to control the input power of the corresponding sub isolated three-port converter independently.

14. The system of claim 9, wherein predetermined output-port voltage references of the N sub isolated three-port converters are the same, predetermined bidirectional-port voltage references of the N sub isolated three-port converters are the same, first predetermined coefficients corresponding to the N sub isolated three-port converters are the same, and second predetermined coefficients corresponding to the N sub isolated three-port converters are the same.

15. The system of claim 9, wherein the average power obtaining device of each of the sub isolated three-port converter controllers comprises an outputting and receiving module configured for outputting a voltage signal representing the input power of the corresponding sub isolated three-port converter to a same average output power bus through a resistor, and for receiving a voltage signal outputted by the average output power bus and representing the average output power.

16. The system of claim 9, wherein the average power obtaining device of each of the sub isolated three-port converter controllers comprises a sending and receiving module configured for sending a voltage signal representing the input power of the corresponding sub isolated three-port converter to a secondary controller, and for receiving the average output power returned by the secondary controller.

\* \* \* \* \*